Patented Oct. 31, 1950

2,528,399

UNITED STATES PATENT OFFICE 2,528,399

N-SUBSTITUTED CARBAMIC ACID ESTERS

Franklin Strain, Norton Center, Ohio, assignor to Pittsburgh Plate Glass Company, Allegheny County, Pa., a corporation of Pennsylvania No Drawing. Application January 23, 1948,
Serial No. 4,065

11 Claims. (Cl. 260—482)

This invention relates to a novel class of carbamate esters which are especially suitable for use as plasticizers and high boiling solvents. It is known that certain carbamates have been prepared previously and applicant has investigated a variety of carbamates. However, it has been found that many of such compounds are unsuitable for many uses because they are crystalline solids which have low compatibility with certain resinous or plastic materials and/or because they are too volatile.

In accordance with the present invention, novel esters have been provided which in general are high boiling liquids of considerably low volatility and high stability. These esters are di-ester-amides of: (a) a secondary amine and (b) a dihydric alcohol bis (acid carbonate) wherein both acid groups of the acid carbonate (b) are converted to their amides with the secondary amine (a). These compounds have the general structure

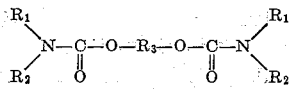

where $R_1$ and $R_2$ are the radicals of a secondary amine

and $R_3$ is the radical of the dihydric alcohol. They may also be regarded as esters of the dihydric alcohol and an N-disubstituted carbamic acid wherein the hydrogens of the amido group of the carbamic acid are substituted with aliphatic, cycloaliphatic and aryl radicals (preferably containing not more than 18 carbon atoms each) of a secondary amine. These radicals are of course linked to the nitrogen through carbon. Of especial interest are the ester amides of lower secondary aliphatic amines which contain not more than 8 carbon atoms in either group attached to the nitrogen atom of the secondary amine. The invention is particularly concerned with the production of ester amides of glycols wherein a pair of alcoholic hydroxyl groups are linked by an uninterrupted carbon chain. However, ester amides of other dihydric alcohols are contemplated as will be apparent hereinafter.

These novel compounds are prepared by reaction of a bis haloformate of a dihydric alcohol such as ethylene glycol dichloroformate, or other similar dihaloformate, with a secondary amine. In general, it is found desirable to conduct this reaction in the presence of a strong base or hydrogen chloride acceptor such as an alkaline earth or alkali metal oxide, hydroxide or carbonate, for example, calcium oxide, magnesium oxide, strontium oxide, sodium hydroxide, potassium hydroxide, calcium hydroxide, magnesium hydroxide or the corresponding carbonates or bicarbonates.

Other alkaline agents which may be used include tertiary amines such as pyridine or quinoline. Furthermore, the process may be conducted in the presence of a substantial excess of the secondary amine which is being reacted with the dichloroformate and in such a case the excess of amine acts as a hydrogen chloride acceptor for the purpose of promoting the reaction.

The temperature at which the reaction is conducted depends to a very substantial degree upon the nature of hydrogen chloride acceptor or basic agent which is used. For example, when pyridine or aqueous sodium hydroxide is used as the basic agent, temperatures below 25° C., usually of the order of 0 to 15° C., are found preferable. On the other hand, when calcium carbonate is used as the basic agent, temperatures as high as 50 to 100° C. are found to be desirable. Usually the temperature is such as to maintain the reaction mixture in liquid state.

The process is conducted simply by mixing the reactants in the presence of sufficient basic acting agent to take up evolved HCl while controlling the temperature to prevent overheating. After the reaction has been completed, the carbamate ester normally is recovered by washing out the water soluble components with water or aqueous alkaline solution and thereafter heating the washed product in vacuo until volatile components have been distilled off.

Various secondary amines may be treated. Especially desirable products may be obtained by reaction of the bis chloroformate with a secondary aliphatic or cycloaliphatic hydrocarbon amine such as dimethyl amine, diethyl amine, di-isopropyl amine, di-n-propyl amine, di-n-butyl amine, di-isobutyl amine, diallyl amine, dipropargyl amine, diamyl amine, dioctadecyl amine, ethylene imine, dilauryl amine, dioctyl amine, methyl ethyl amine or di-cyclopentyl amine. These ester amides are miscible with wide ranges of solvents and are compatible in wide ranges with resinous compositions such as polyvinyl chloride, cellulose acetate, etc.

Other amines such as dialkylol amines, for example diethanol amine, dipropanol amine, etc.

may be prepared with consequent production of water soluble products.

Carbamate esters of somewhat lower compatibility may be obtained by the reaction of the bis chloroformate with diaryl amines such as diphenyl amine, di-o-tolyl amine, di-n-tolyl amine, di-p-tolyl amine, dibenzyl amine and dinaphthyl amine or aliphatic-aryl amines such as N-ethyl aniline, N-isoamyl aniline, N-isobutyl aniline, N-allyl aniline, N-methyl-o-toluidine or N-methyl-m-toluidine.

The invention is particularly concerned with the ester amides of simple dihydric alcohols, which contain a pair of alcoholic hydroxy groups linked together by an uninterrupted carbon chain. Thus the invention particularly contemplates the ester amides of various monoglycols which form bis chloroformates or bis haloformates, such as the 1,2 alkylene glycols including ethylene glycol, propylene glycol, n-butylene glycol, isobutylene glycol, styrene glycol, etc., or other glycols such as trimethylene glycol, tetramethylene glycol, hexamethylene glycol, 1,8 octanediol, etc. Furthermore ester amides of other dihydric alcohols, or dihydroxy compounds which form chloroformates such as chloroformates of phthalyl alcohol, resorcinol, pp' dyhydroxy diphenyl ether, tartaric acid and esters thereof, glycerol monoethyl ether, glycerol monobutyl ether, 4,4' methylene bisphenol, 4,4' ethylidene bisphenol, 2,4' methylene bisphenol and equivalent alkylidene bis phenols or of resorcinol may be reacted with secondary amines according to this invention.

Liquid ester amides of low volatility and superior plasticizing power, particularly for polyvinyl chloride, may be obtained from alkylene polyglycols particularly those containing up to 6 glycol units, such as diethylene glycol, triethylene glycol, tetraethylene glycol, dipropylene glycol, tripropylene glycol, diisobutylene glycol, the corresponding tri- or tetra-isobutylene glycols, di- trimethylene glycol and other polyglycols of glycols containing up to 6 carbon atoms.

The invention is primarily concerned with the ester amides of lower liquid dihydric alcohols containing up to 10 carbon atoms. However, ester amides of higher dihydric alcohols also may be prepared.

The new class of esters herein contemplated are generally soluble in organic solvents including acetone, ethyl alcohol, ether, toluene, benzene and chloroform. The esters usually are colorless and frequently possess a fairly sweet odor. The compounds are valuable for the plasticizing of various resins and plastic compositions. Typical compositions in which these novel esters are found to be valuable include the cellulose esters and ethers such as cellulose nitrate, cellulose acetate, ethyl cellulose, cellulose acetobutyrate, etc., or the vinyl resins including polymers of vinyl acetate, vinyl chloride, vinylidene chloride, vinyl acetal or vinyl butyral, styrene, methyl methacrylate or diallyl esters such as diallyl carbonate or diallyl phthalate, glycol maleate, glycol fumarate, etc. They have been found be to particularly useful as plasticizers for polyvinyl chloride or chloride-vinyl acetate copolymers. These new type carbamate esters are especially advantageous because of their low volatility, low water solubility, high fluidity and superior compatability. In these respects, the new esters herein claimed are much superior to the corresponding amides obtained from primary amines. Generally speaking the aliphatic ester amides derived from aliphatic glycols and aliphatic amines have compatibility characteristics with commercial resins which are superior to those of the aromatic series.

The following examples are illustrative:

*Example 1*

Into a 4-liter beaker was placed 438 grams of diethylamine and 504 grams of sodium bicarbonate. Enough ice was added to the mixture to lower the temperature below 10° C. Then, with vigorous stirring, 693 grams of diethylene glycol bis (chloroformate) was slowly added. Additional ice was added to the mixture to maintain a temperature below 10° C. After the addition of the chloroformate was complete, the reaction mixture was allowed to stand with stirring until the mixture warmed to room temperature. The reaction contents were transferred to a separatory funnel and washed free of soluble solid material with equal volumes of cold water. One liter of benzene was added as a solvent and washing continued with equal volumes of one percent pyridine solution until the solution was free of chloroformate. The benzene layer was washed with one percent aqueous HCl solution until the solution was acid and finally with cold water until the solution was free of chloride. The benzene was distilled out, one percent by weight of decolorizing carbon was added and the product heated up to 150° C. at 3 millimeters pressure. On filtering, a clear colorless liquid was obtained.

A 135.4 gram sample of the product obtained from the above preparation was washed with equal volumes of 5% caustic until basic (2 washings) and then with 5% HCl until acidic (2 washings). The sample was then washed with dilute solutions of sodium bicarbonate followed by cold water washes until neutral. The product was transferred to a still fitted with a Claisen head and distilled at 146–152° C. and a pressure of 2.5–3 millimeters. The properties of this liquid product are as follows:

| | |
|---|---|
| Refractive index $N_D^{20}$ | 1.4543 |
| Sp. gravity, 20° C | 1.046 |
| Viscosity, 20°, Cstks | 22.1 |
| Surface Tension, 20° C., dynes/cm | 38.2 |
| Flash point | 363.2 |
| Fire point | 392 |

This compound has the probable structure

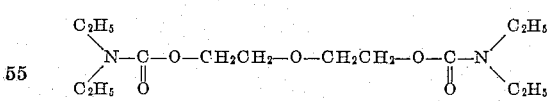

Similar esters which have somewhat higher boiling points may be prepared by use of triethylene glycol bis chloroformate, tetraethylene glycol bis chloroformate or dipropylene glycol bis chloroformate in lieu of diethylene glycol bis chloroformate in this example.

*Example 2*

Into a 4-liter beaker was placed 551.3 grams of di-n-butylamine and 360 grams of sodium bicarbonate. Enough ice was added to maintain the temperature below 10° C. With vigorous stirring, 494.3 grams of diethylene glycol bis (chloroformate) was slowly added. Ice was added to keep the temperature below 10° C. After the addition of the chloroformate was complete, the mixture was allowed to stand with stirring for one hour. At the end of this period carbon dioxide continued to be evolved and approximately 100 grams additional NaHCO₃ was added and the mixture was allowed to stand overnight. The reaction mixture was transferred to a separatory funnel and 1 liter of ethylene dichloride was added. This mixture was washed with water and then with one percent aqueous pyridine until the mixture was free of chloroformate chlorine. Thereafter, the product was washed with one percent aqueous HCl solution until the mixture was acidic and finally with water until the product was free of chloride. Five percent by weight of decolorizing carbon was added and the resulting mixture was heated up to 170° C. at 5 millimeters pressure and filtered.

The resulting product is a clear colorless liquid having the following properties:

Refractive index, $N_D^{20}$ _____ 1.4552
Sp. gravity, 20° C _____ .972
Viscosity 20° C., cstks _____ 54.8
Flash point, °F _____ 417.2
Fire point, °F _____ 447.8

This compound has the probable structure:

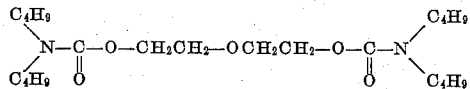

Example 3

To a stirred mixture of 50.5 grams of diethanolamine, 42.5 grams of sodium bicarbonate and 100 milliliters of water was added 58 grams of diethylene glycol dichloroformate in the course of one hour and the temperature during the addition was maintained at 5–10° C. After the addition had been completed dilute aqueous hydrochloric acid was added in amount sufficient to raise the pH of the solution to 3. The clear solution was extracted with ether. Only a trace of oily material was found in the ether extract upon evaporation. Acetone (200 milliliters) was added to precipitate most of the salt from the solution. The filtrate from the salt separation was evaporated to dryness at reduced pressure. The resultant cake was extracted with 300 milliliters of acetone and the remaining salt was separated by filtration. The acetone was distilled off and the product heated at 100° C. and a pressure of 10 millimeters for one hour. A very viscous, yellowish syrup remained in the flask. This color was removed by heating with decolorizing carbon. The product is a viscous essentially colorless liquid which is soluble in water and acetone but essentially insoluble in ether. The product has the probable structure:

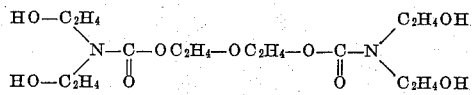

This product is quite hygroscopic and differs in this respect and in its high water solubility from the products of corresponding hydrocarbon amines.

Example 4

504 grams of sodium bicarbonate and 774 grams of dibutyl amine was placed in a 4-liter beaker which was provided with a thermometer, and a nickel stirrer. About 500 grams of ice was introduced into the mixture and 561 grams of ethylene glycol bis (chloroformate) was added slowly through a dropping funnel while ice was added to maintain the temperature below 10° C. After addition of the chloroformate, the reaction mixture was stirred until evolution of $CO_2$ moderated (about 1½ hours) and then was slowly brought to room temperature.

One liter of benzene was added and the oil layer was recovered, washed twice with 1% aqueous pyridine, twice with dilute aqueous sodium bicarbonate, and finally twice with distilled water. 0.5% by weight of decolorizing carbon was added and the mixture was purified by distilling off volatile impurities at 160° C. and 3 millimeters pressure. The ethylene glycol bis (N,N-di-n-butyl carbamate) was obtained in approximately 85% yield. This product is a fluid colorless liquid having the following properties:

Index of refraction $N_D^{20}$ _____ 1.4539
Specific gravity, 20/4° C _____ 0.962
Viscosity, 20° C., centistokes _____ 51.5

Similar products may be prepared using the bischloroformates of monopropylene glycol, and other of the above described dihydric alcohols. Furthermore, diethyl amine, di propylamine and similar dialkyl amines may be used in lieu of dibutyl amine.

The following table indicates pertinent properties of other carbamates prepared according to this invention:

| Compound | Refractive Index $N_D^{20}$ | Sp. Gravity 20/4° C. | Viscosity 20° C Cstks. |
|---|---|---|---|
| Diethylene Glycol Bis (N,N-Diisopropyl Carbamate) | 1.4544 | 1.018 | 133.6 |
| Diethylene Gylcol Bis (N,N-Di-n-Butyl Carbamate) | 1.4552 | 0.972 | 54.8 |
| Triethylene Glycol Bis (N,N-Di-n-Butyl Carbamate) | 1.4565 | 1.012 | 64.8 |
| Tetraethylene Glycol Bis (N,N-Di-n-Butyl Carbamate) | 1.4579 | 1.009 | 67.8 |
| Diethylene Glycol Bis (N,N-Diisobutyl Carbamate) | 1.4528 | 0.968 | 122.2 |
| Diethylene Glycol Bis [N,N-Bis (2-Ethyl-hexyl) Carbamate] | 1.4647 | 0.958 | 618.7 |
| Monoethylene Gylcol Bis (N,N-Ethyl Phenyl Carbamate) | 1.5429 | 1.143 | 2,337. |
| Hexamethylene Glycol Bis (N,N-Dibutyl Carbamate) | 1.4570 | 0.945 | 57.4 |

Although the present invention has been described with particular reference to the specific details of certain embodiments thereof, such details should not be regarded as limitations upon the scope of the invention except insofar as included in the accompanying claims.

This application is a continuation-in-part of my copending application, Serial No. 644,427, filed January 30, 1946, and my copending application Serial No. 749,591, filed May 21, 1947.

What is claimed:

1. A diester amide of (A) a secondary hydrocarbon monoamine which contains up to 18 carbon atoms in each hydrocarbon group, and (B) a dihydric alcohol bis (acid carbonate), said alcohol containing up to 10 carbon atoms; wherein both acid groups of (B) are amidated with (A).

2. The diester amide of claim 1, wherein the dihydric alcohol is an alkylene glycol which contains up to 10 carbon atoms.

3. The diester amide of claim 1, wherein the dihydric alcohol is ethylene glycol.

4. The diester amide of claim 1, wherein the dihydric alcohol is propylene glycol.

5. A diester amide of (A) a secondary aliphatic hydrocarbon monoamine which contains up to 18 carbon atoms in each aliphatic hydrocarbon group, and (B) a dihydric alcohol bis (acid carbonate), said alcohol containing up to 10 carbon atoms; wherein both acid groups of (B) are amidated with (A).

6. A diester amide of (A) a secondary aliphatic hydrocarbon monoamine which contains up to 8 carbon atoms in each aliphatic hydrocarbon group, and (B) a dihydric alcohol bis (acid carbonate), said alcohol containing up to 10 carbon atoms; wherein both acid groups of (B) are amidated with (A).

7. Ethylene glycol bis (N,N-di-n-butyl carbamate).

8. A method of preparing a carbamate which comprises mixing a bis haloformate of a dihydric alcohol with a secondary amine in the presence of an alkaline agent, and in the proportion of 2 moles of amine per mole of bis haloformate, and recovering, from the resulting reaction mixture, the resulting diester amide.

9. A method of preparing a carbamate which comprises mixing a bis chloroformate of a dihydric alcohol with a secondary amine in the presence of an alkaline agent, and in the proportion of 2 moles of amine per mole of bis chloroformate, and recovering, from the resulting reaction mixture, the resulting diester amide.

10. The process of claim 9, wherein the chloroformate is ethylene glycol bis chloroformate.

11. The process of claim 9, wherein the chloroformate is propylene glycol bis chloroformate.

FRANKLIN STRAIN.

REFERENCES CITED

The following references are of record in the file of this patent:

UNITED STATES PATENTS

| Number | Name | Date |
|---|---|---|
| 1,927,858 | Ulrich | Sept. 26, 1933 |

OTHER REFERENCES

Rojahn, Berichte 54B, 3118–3121 (1921).